Dec. 8, 1931.   E. F. SIPHER   1,835,533

MOTOR CONTROL SYSTEM

Filed Jan. 28, 1926   6 Sheets-Sheet 1

INVENTOR
Edmund F. Sipher

Dec. 8, 1931.  E. F. SIPHER  1,835,533
MOTOR CONTROL SYSTEM
Filed Jan. 28, 1926  6 Sheets-Sheet 2

Fig. 3.

WITNESSES:
G. S. Neilson
J. E. Hardy

INVENTOR
Edmund F. Sipher
BY
Wesley G. Carr
ATTORNEY

Dec. 8, 1931.   E. F. SIPHER   1,835,533
MOTOR CONTROL SYSTEM
Filed Jan. 28, 1926   6 Sheets-Sheet 3

WITNESSES:
G. S. Neilson
J. E. Hardy

INVENTOR
Edmund F. Sipher
BY
ATTORNEY

Dec. 8, 1931.  E. F. SIPHER  1,835,533
MOTOR CONTROL SYSTEM
Filed Jan. 28, 1926   6 Sheets-Sheet 4

WITNESSES:

INVENTOR
Edmund F. Sipher
BY
ATTORNEY

Patented Dec. 8, 1931

1,835,533

UNITED STATES PATENT OFFICE

EDMUND F. SIPHER, OF WILKINSBURG, PENNSYLVANIA, ASSIGNOR TO WESTINGHOUSE ELECTRIC & MANUFACTURING COMPANY, A CORPORATION OF PENNSYLVANIA

MOTOR CONTROL SYSTEM

Application filed January 28, 1926. Serial No. 84,420.

My invention relates to motor-control systems and more particularly to a motor-control system that is adapted for governing the pumping of liquid or performing any other motor service wherein the control is effected, at will, either automatically or manually.

In the preferred form of the invention, a master controller is manually or automatically operated to control the speed of one or more motors.

The invention is applicable to the control of variable-speed motors for performing any desired motor duty, and is specifically applicable to variable-speed motors for operating pumps for pumping sewage. In a sewage disposal plant, the rate of inflow of sewage into the suction well is the basis of the service duty of the motors. The plan of operation of the system is to automatically regulate the speeds of one or more motors in accordance with the level in the suction well, a different number of motors being operated over different overlapping ranges of the fluid level. As the maximum or minimum of any particular range is approached, an alarm is given, which indicates that a greater or lesser number of motors is required. The pumping units are manually placed in and out of service, but are normally automatically controlled by the master controller, or master switch, while in service.

Since the sewage usually carries with it more or less sand, gravel and cinders, especially where storm sewers are combined with sanitary sewers, means must be provided to collect this material, which would otherwise get into the pumps and cause filling up of the suction well as well as rapid wear of the pumps. Experience has shown that if a grit chamber is provided through which the sewage flows before reaching the suction well, and the velocity of the sewagae through the grit chamber is maintained at about 1 foot per second, the grit, etc. will be deposited in the grit chamber. If the velocity is lower than this, some of the organic matter of the sewage will also be deposited. If the velocity is above the 1 foot per second rate, the grit will be carried over into the pump well. The velocity of the sewage may be controlled by the speed of the pumps, which are governed in accordance with variations in the level of the sewage.

My invention will be best understood by reference to the accompanying drawings, in which.

Figure 1:
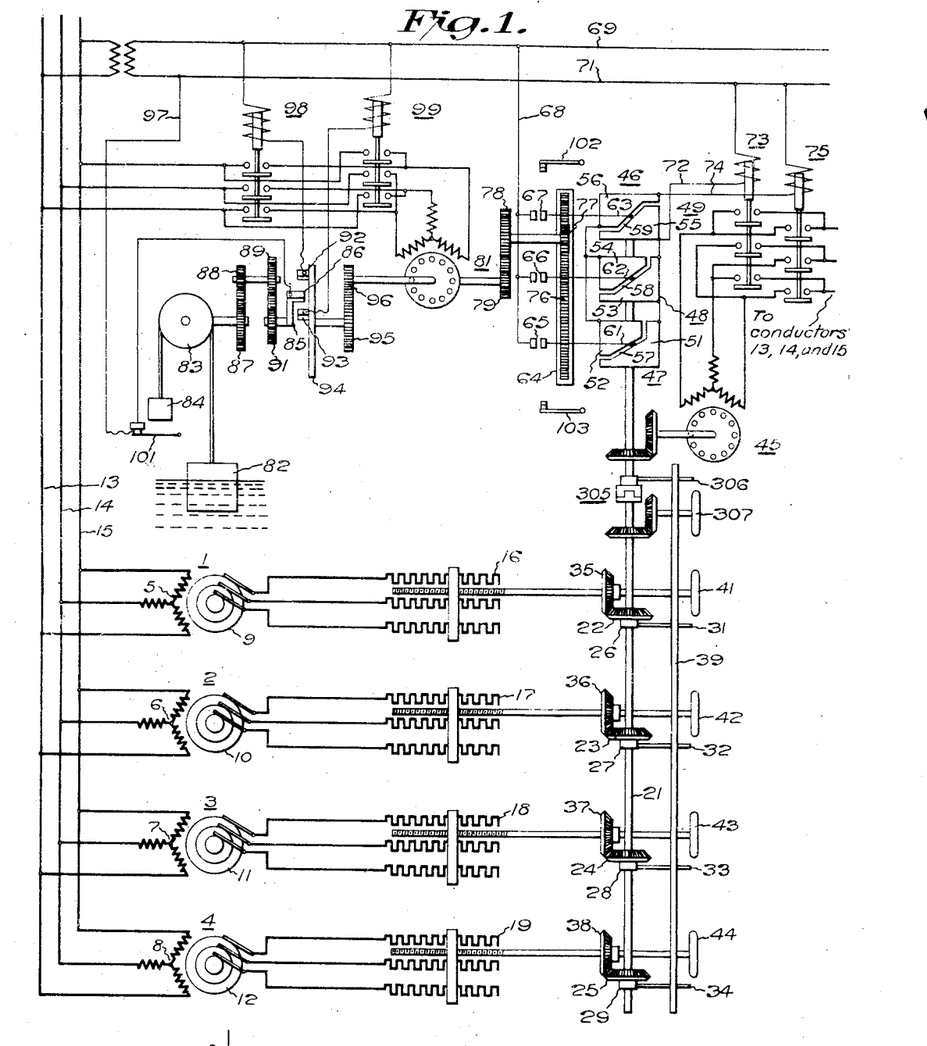
Fig. 1 is a diagrammatic view of the main apparatus and of a part of the control circuits employed in practicing the invention.
Figure 6:
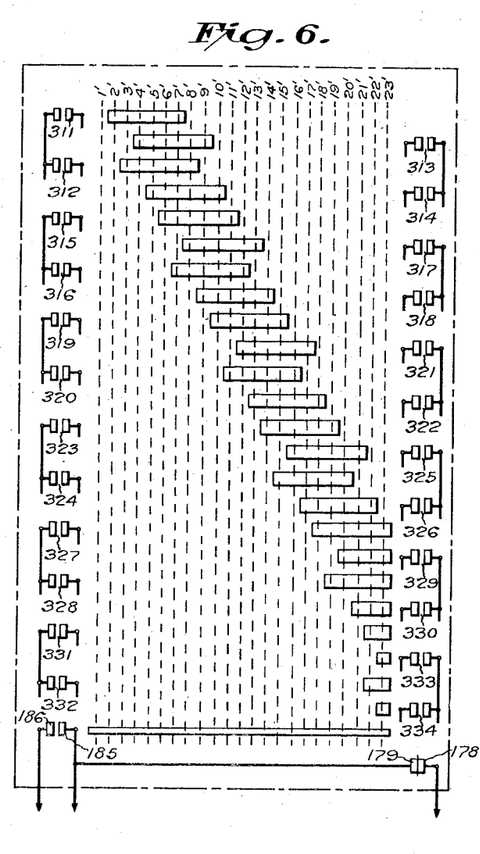
Fig. 6 is a diagrammatic view of a controller for governing the secondary circuit of one of the pumping motors.

Referring to Fig. 1 of the drawings, pumping motors 1, 2, 3 and 4, which are indicated as wound-rotor induction motors, are provided with three-phase primary windings 5, 6, 7 and 8, and secondary windings 9, 10, 11 and 12, respectively. The primary windings are connected to a three-phase power circuit 13, 14, 15 and the secondary windings are respectively connected to controllers 16, 17, 18 and 19, for controlling the speeds of the motors, the steps of operation of which are best indicated in Fig. 6.

The several controllers are adapted to be actuated in accordance with the movement of a shaft 21, upon which are loosely mounted a plurality of bevel gear-wheels 22, 23, 24 and 25, which are respectively provided with clutches 26, 27, 28 and 29, for connecting the several gear-wheels to the shaft. The clutches are respectively provided with operating levers 31, 32, 33 and 34 for connecting and disconnecting their respective gear-wheels to and from the shaft 21, and thus operating their respective controllers by means of cooperating shafts and gear-wheels 35, 36, 37 and 38.

A control panel 39 (shown edgewise) is provided, upon which are mounted handwheels 41, 42, 43 and 44, which are respectively secured to the shafts of the controllers 16, 17, 18 and 19 for manual operation, when the corresponding clutch is disconnected. A pilot motor 45 is provided for actuating the shaft 21 and for operating as many of the controllers 16, 17, 18 and 19 as are connected to the shaft by means of their respective clutches. The shaft 21 also normally actuates the drums of a master controller 46 that governs the operation of the pilot motor 45, which derives its energy from supply conductors 13, 14 and 15.

Figure 9:
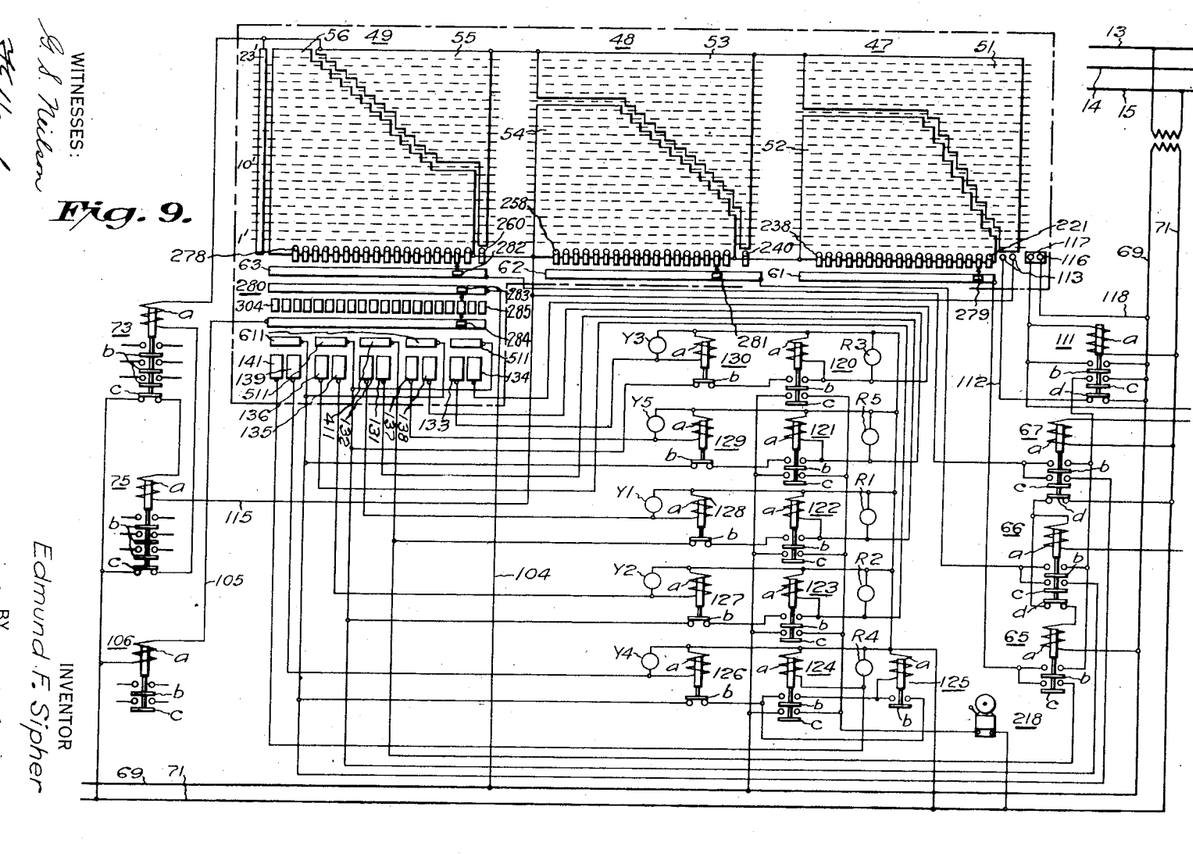

The master controller or master switch 46 comprises three control sections or drums 47, 48 and 49, each comprising a pair of conducting segments 51 and 52, 53 and 54, and 55 and 56, respectively, that are separated by zig-zag strips, or the like, of insulating material 57, 58 and 59, as best illustrated in Fig. 9 of the drawing. Contact members 61, 62 and 63 are provided for the three drums and are caused to be connected to the one or the other of the conducting segments of their respective drums in accordance with the operation of a rack bar 64, and also in accordance with the rotation of the master switch 46.

The contact members 61, 62 and 63 are respectively connected to switches 65, 66 and 67 and, by means of a conductor 68, to one of the control supply-circuit conductors 69. The corresponding conducting segments 51, 53 and 55 are connected together and, by means of conductor 72, are connected through the operating coil of a switch 73 to the other control supply-circuit conductor 71. The corresponding contact segments 52, 54 and 56 of the three respective drums 47, 48 and 49 are similarly connected together, and, by means of conductor 74, are connected through the operating coil of a switch 75 to the supply conductor 71. The switches 73 and 75 are provided for controlling the direction of operation of motor 45.

The rack bar 64 is provided with a rack 76 that is engaged by a pinion 77, which is connected by means of gear-wheels 78 and 79 to a pilot motor 81, which derives its energy from supply conductors 13, 14 and 15. A float 82 is provided for actuating a sheave 83 in accordance with the level of fluid in the pumping well, the float being attached, by means of a cable hung over the sheave, to a suitable counter-weight 84. The sheave 83 actuates an arm 85 and contact member 86, through gear-wheels 87, 88, 89 and 91. The contact member 86 is adapted to operate between and engage the one or the other of contact members 92 and 93, which are carried by a disk 94 that is connected by means of gear-wheels 95 and 96 to the pilot motor 81.

The contact members 92 and 93 are respectively connected through the operating coils of switches 98 and 99, which are adapted to energize the motor 81 to operate in the one or in the other direction. The contact member 86 is connected through a limit switch 101, that is actuated by the counter-weight 84, and by means of a conductor 97 to one of the supply conductors 71. The counter-weight 84 will open the limit switch 101 when the float 82 rises to a predetermined level, or in case the cable carrying the weight should break.

As the level in the pumping well changes, the float 82 will operate the sheave 83 and, consequently, actuate the contact member 86, varying its position to correspond to variations in the level of the fluid. As the contact member 86 engages one of the contact members 92 and 93, the corresponding switch 98 or 99 will be operated, thereby causing the motor 81 to rotate in the one or in the other direction, thus correspondingly actuating the rack bar 64.

The three drums 47, 48 and 49 of the master controller 46 are used, respectively, for the operation of one, two or three of the main pumping motors. The shapes of the conducting segments of the several drums are different, being so designed as to properly adjust the loads on the motors in accordance with the level of the fluid being pumped and in accordance with the number of motors being operated. The normal or stable position of the master controller 46 is such that the circuit through the energized contact member 61, 62 or 63 is interrupted by the corresponding strip of insulating material 57, 58 or 59, so that no current will flow through the conducting segments of the drum and through the operating coils of switches 73 and 75.

As the rack bar 64 is operated, shifting the position of the contact between one of the master switch drums, such as 47, and its associated energized contact member, such as 61, engagement will be made with the one or the other of the conducting segments 51 and 52, which will cause the actuation of one of the switches 73 or 75, thereby effecting operation of the pilot motor 45 in the one or in the other direction. The direction of rotation of the master controller 46, which is operated by the pilot motor 45, will be such that the circuit through the operating coil of switch 73 or switch 75 will be again broken by the insulating material 57.

The extent of operation of the motor 45 will, therefore, depend upon the extent of movement of the rack bar 64, since that factor determines the extent of rotation of the master switch drum that is necessary to again interrupt the circuit. The operations of the drums 48 and 49 are similar to that of drum 47, excepting that the shapes of the conducting segments and of the insulating strips between them are different from those of drum 47, so that the position of rest for the master switch upon a given movement of the bar 64 will be correspondingly different, thus causing a different degree of operation of the controllers connected to the shaft 21 for a given change in fluid level, depending upon the number of pumping motors that are operating.

It will be noted that the gear-wheels 87 and 91 which engage the gear-wheels 88 and 89 respectively, are of different diameters. The purpose of these gear wheels is to provide an adjusting mechanism between the sheave 83 and the contact-carrying arm 85, so that the system may be adjusted to vary the rate of pumping at any particular fluid level. The gear wheels 88 and 89 are adapted for planetary adjustment about the axis of the gear-wheels 87 and 91 so as to select the relative angular position between the gear-wheels 87 and 91 and, consequently, between the sheave 83 and the contact-carrying arm 85. This changes the position of the rack bar 64 that corresponds to a given position of the float 82.

Before discussing in detail the control circuits, as illustrated in Figs. 3 to 10, inclusive, it is desirable to discuss briefly the operation of the master control and the signal system actuated thereby. The function of the master controller is to vary the speeds of the pumping motors in accordance with the elevation of sewage in the suction well. Within the first stage, one pump is in operation, and the relation of the rate of pumping to the elevation of fluid is represented by the curve I in Fig. 2. When the sewage level reaches the point represented by $a$ on the curve, a yellow light is illuminated, for example, to indicate that a second motor should be started.

Figure 2:
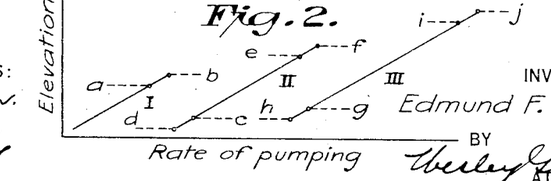
Fig. 2 is a diagram showing the operating characteristics of the system.

The attendant will manually start the operation of a second motor and throw in the clutch connecting the motor controller to the shaft 21. The master controller 46 will then govern the two motors to control the rate of pumping in accordance with the curve II. Should the attendant fail to note the signal at the elevation $a$ and the sewage level continues to rise to an elevation represented by the point $b$ on curve I, the master controller will cause a red pilot light to glow and will also cause a bell alarm to ring until the sewage level recedes below the point represented by $b$, or until a second motor is put into operation.

Within the second and third stages, that is, the stages represented by the curves II and III of Fig. 2, the master controller 46 will function in the same manner as described, that is, causing a yellow lamp to glow as the points $e$ and $i$ are reached during the operation of two or three motors, respectively, and causing a red lamp to glow and a bell alarm to ring as the points $f$ and $j$ are reached.

Similarly, also during the third or second stages, as the level in the suction well recedes to a value indicated by the points $g$ and $c$ on the curves III and II, respectively, a yellow pilot light will be caused to glow, indicating that one of the motors should be shut down. Should the attendant fail to heed this signal until the fluid level has reached the points indicated by $h$ and $d$, on the curves III and II, respectively, a red pilot light will be caused to glow and a bell alarm to ring. In general, switches are indicated on the drawings by a numeral, having an operating coil lettered $a$. The circuit closing contacts and interlocks that are operated with the switch are lettered $b$, $c$, $d$, etc.

Figure 3:
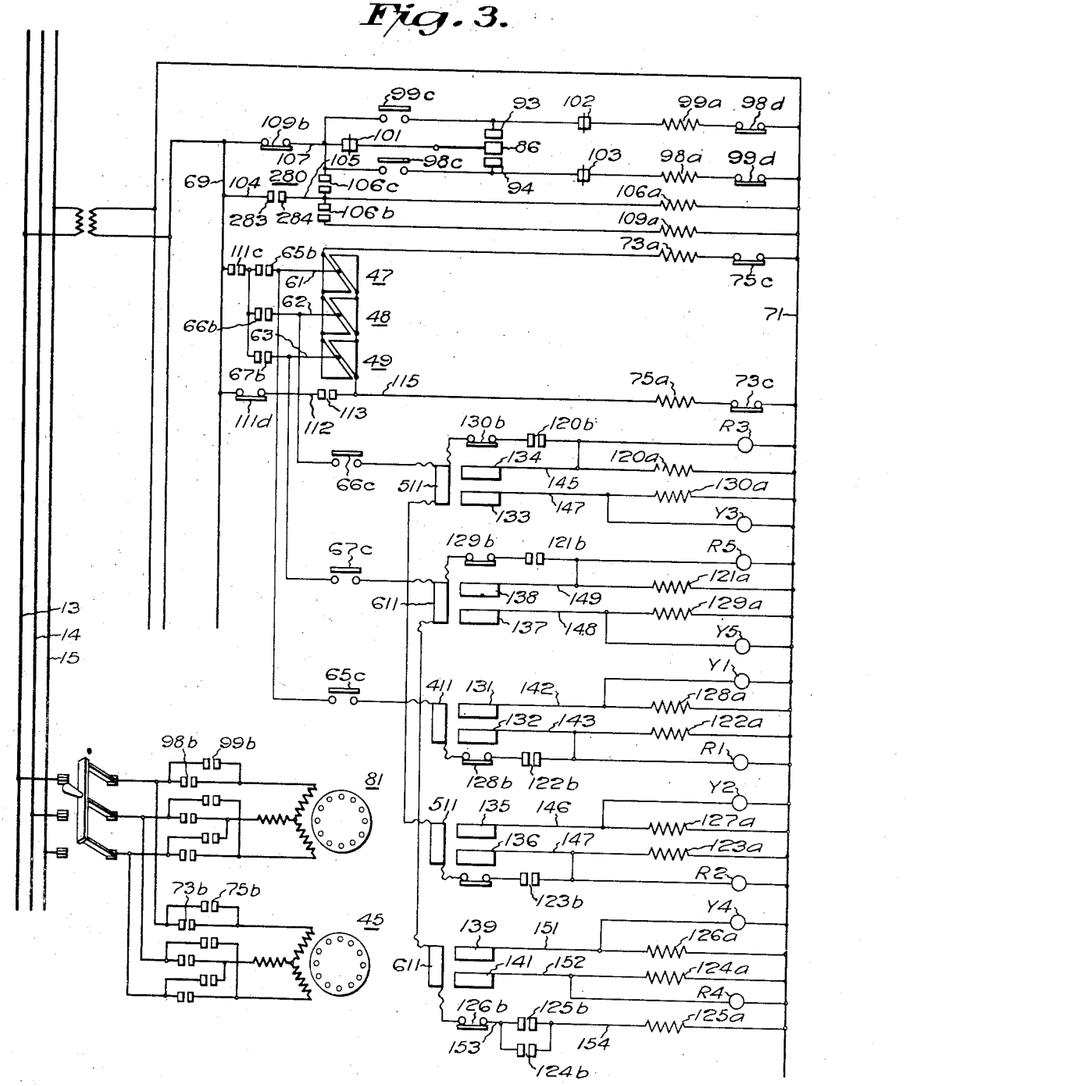
Figs. 3, 4 and 5 are straight line diagrams of the control circuits.
Figures 4, 5:
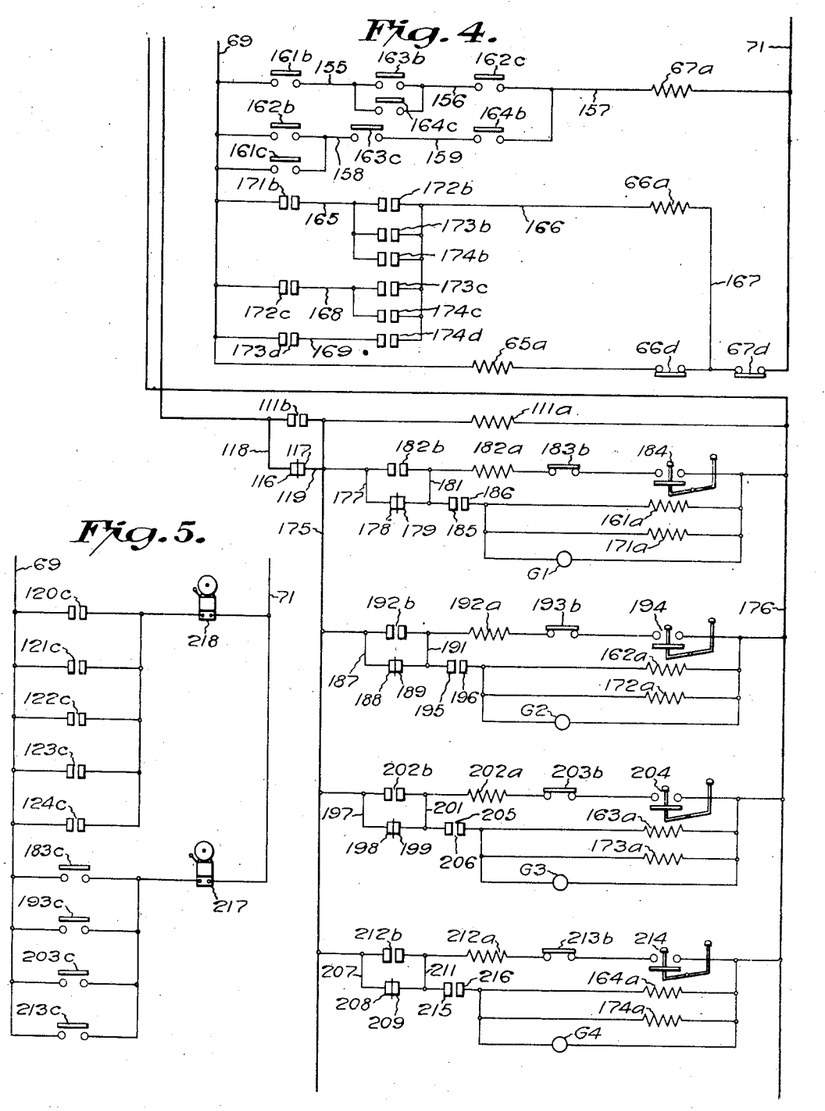
Figure 8:
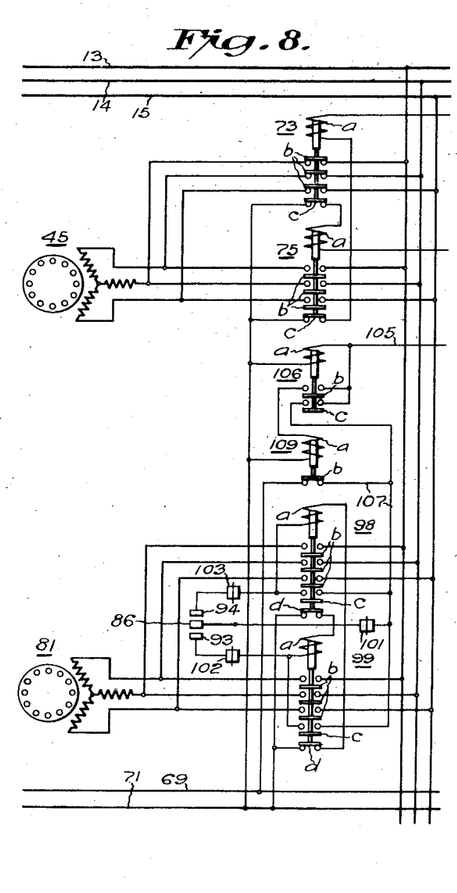
Figs. 8, 9 and 10 are diagrammatic views of the control apparatus and circuits shown in the single line diagrams comprised in Figs. 3, 4 and 5.
Figure 10:
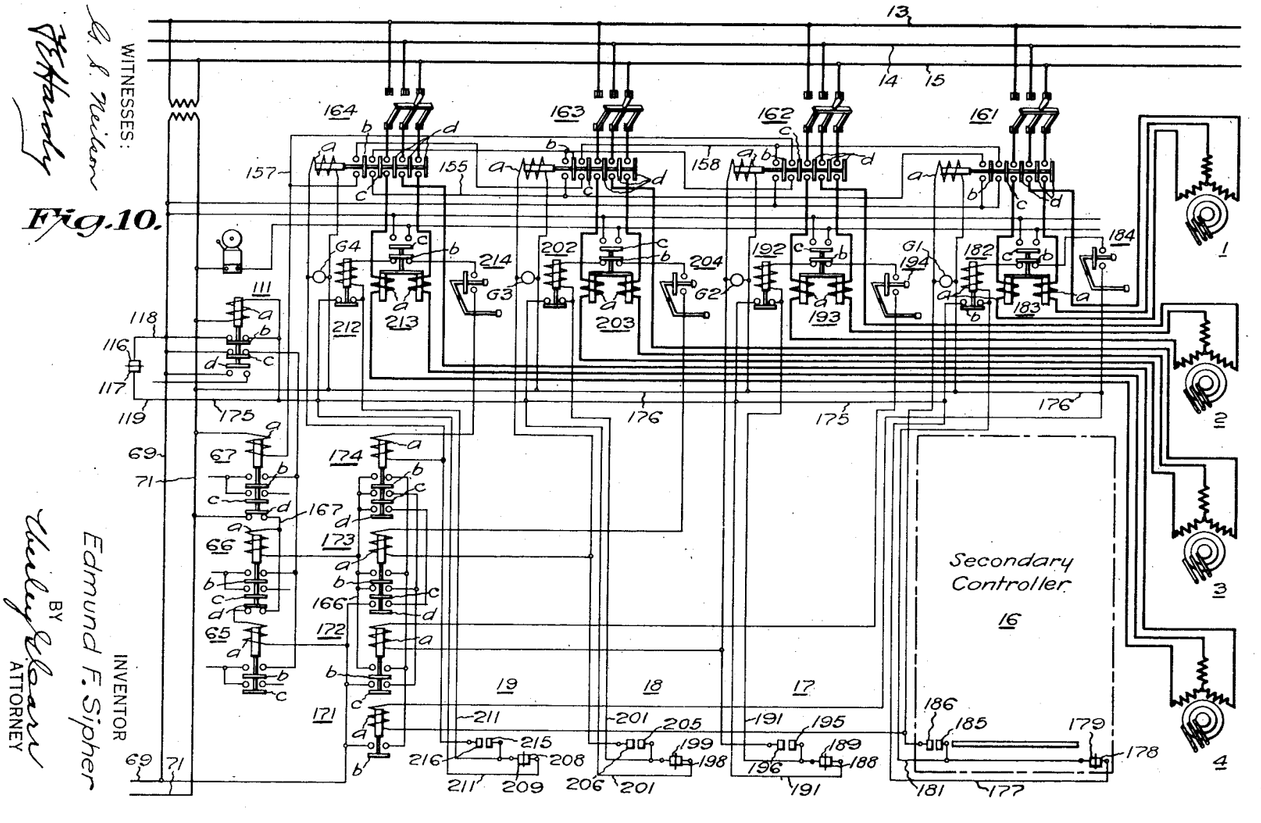

Referring to Figs. 3, 4 and 5 of the drawings, illustrating the control circuits in a straight line diagram and to Figs. 8, 9 and 10, showing the control circuits and relays diagrammatically, the circuits of the operating coils 98a and 99a of the switches 98 and 99, for controlling the pilot motor 81, are as follows: From the control supply-circuit conductor 69, a circuit is traced through interlock 109b, conductor 107, and limit switch 101 on the float 82 to the contact member 86 that is actuated by the float.

As the contact member 86 engages contact member 92, the circuit is continued through a limit switch 103, which is actuated by the rack bar 64, operating coil 98a of the pilot motor control switch 98, and interlock 99d to the supply conductor 71. Similarly, as the contact member 86 and the contact member 93 engage, a circuit will be completed through the limit switch 102, which is also actuated by the rack bar 64, through the operating coil 99a of the switch 99, and through the interlock 98d to the supply conductor 71. The interlocks 98d and 99d, therefore, respectively interrupt the circuits through the operating coils of switches 99 and 98, preventing both switches from being in a closed position at the same time.

When one of the switches 98 and 99 is energized upon the engagement of the contact member 86 with one of the contact members 92 and 93, the motor 81 will operate, thereby moving the rack bar 64. In order to insure that the bar 64, once started, will move a predetermined distance, an interlock 280, comprising contact members 283 and 284 that are connected between the conductors 104 and 105, is provided. This interlock is closed as the bar 64 starts to move, and is adapted to remain closed during a predetermined movement of the bar. The details of interlock 280 are best shown on Fig. 9 of the drawings and will be hereinafter described in greater detail.

Upon closing of the interlock 280 on the rack bar, a circuit is closed through conductors 104, 105 and the operating coil of a relay 106, which closes a pair of interlocks 106b and 106c. The circuit through the interlock 106c continues through one of the interlocks 98c or 99b, corresponding to the motor-reversing switch that has been operated, forming a circuit in parallel relation to that through the contact member 86, thus insuring that the motor reversing switch will be energized for the proper interval of time to move the rack bar 64 a definite distance, independently of the circuit through the contact member 86. The circuit through the contact member 106b operates a relay 109, which opens the interlock 109b, thus interrupting a circuit to the conductor 107 and the contact member 86 from the conductor 69.

It will be seen, therefore, that engagement of the contact member 86 with one of the contact members 94 or 93 causes the operation of one of the switches 98 or 99, but that a circuit is immediately established through interlock 280, conductors 104, 105, 107, and one of the interlocks 98c or 99c for maintaining the operated switch 98 or 99 closed for a predetermined time, and that as this second circuit is established, the circuit through interlock 109b is interrupted, so that the deenergization of the switch 98 or 99 is controlled by the contact members 283 and 284 (see Fig. 9) that are actuated by the rack bar 64, and which interrupt a circuit through interlock 106c, and conductors 104 and 105. This action insures a step-by-step operation of the master controller by causing the bar 64 to move a distance corresponding to the spacing between successive contact fingers of the master switch. The limit switches 102 and 103 are provided to interrupt the closure of the motor-operating switches 99 and 98, respectively, when the rack bar 64 reaches the end of its operative range.

As the rack bar 64 is operated, a circuit will be closed between the supply conductors 69 and 71 through low-voltage interlock 111c, one of the switches 65b, 66b, or 67b, the corresponding drum of the master controller 47, 48 or 49, through one of the operating coils 73a or 75a, and interlock 75c or 73c, thus causing the operation of one of the switches 73 or 75 and, consequently, of the motor 45.

An interlock comprising contact members 113 is connected between conductors 112 and 115 for energizing the switch coil 75a through the low-voltage interlock 111d upon the failure of voltage. The interlock 111d closes upon failure of voltage, thus closing a circuit through the operating coil 75a for actuating the switch 75 upon the return of voltage to the system, and causing the master controller 46 to be returned to its initial or off position. This circuit is interrupted through the contact members 113 when the controller reaches its off position (see Fig. 9).

The interlocks 65c, 66c and 67c are closed upon closing of their associated switches 65b, 66b and 67b, respectively, and correspond to the operation of one, two or three pumps. Upon the closing of the interlock 65c, for example, a contact member 411 is connected to the supply circuit conductor 69 through interlocks 65b and 111c. As the level in the suction well rises to a level corresponding to the point a in Fig. 2, the contact member 131 will engage contact member 411, thus completing a circuit through conductor 142 and the coil 128a of relay 128 to the supply conductor 71, causing the glowing of the yellow pilot light Y1, which is connected in parallel relation to the coil 128a, thus giving the signal to the station attendant to start a second motor. The operation of the relay 128 opens the interlock 128b and interrupts a circuit through the red pilot light R1, if the interlock 122b is closed.

Should the station attendant fail to start the second motor in response to the yellow pilot light signal, the contact member 132 will engage the contact member 411 when a level corresponding to the point b on the curve I of Fig. 2 is reached, thereby closing a circuit through conductor 143 and the operating coil 122a of the relay 122. At the same time, the red light R1, which is connected in parallel circuit relation to the coil 122a, will glow and the operation of the relay 122 will close the interlock 122b, for a purpose to be later described, and also the interlock 122c, causing the bell 218 to ring.

When contact member 132 engages contact member 411, causing the red signal light R1 to glow, the contact member 131 is disengaged from the contact member 411, thus extinguishing the yellow signal light Y1 and releasing the relay 128 to close the interlock 128b, so that a circuit is maintained through the interlocks 128b, and conductor 143 to the coil 122a, and to the red light R1, thus causing the alarm to continue until the level of the fluid decreases below the point represented by b of curve I, or until the circuit through the interlock 65c is interrupted, as it will be when a second motor is started.

Should the level of the fluid decrease below that corresponding to the point b of the curve I, before a second motor is started, so that the contact member 131 will again engage the contact member 411 and cause the yellow light Y1 to glow, the relay 128 will be again energized and the interlock 128b will be opened, disconnecting the relay 122 and the red light R1.

After a second motor is started by the attendant, the switch 65 will automatically be opened and the switch 66 will automatically close in a manner to be later described. Also the interlock 65c will be opened and the interlock 66c will be closed, thus connecting the conducting member 511 to the supply conductor 69. Should the level of the fluid rise to an elevation indicated by the point e of curve II, the contact member 135 will engage the contact member 511, thereby operating the relay 127 and causing the glowing of the yellow light Y2, which is in parallel circuit relation to the operating coil of that relay.

Should the level of the fluid continue to rise to an elevation corresponding to the point $f$ of curve II, the contact member 136 will engage contact member 511, thereby causing the operating coil 123a of the relay 123 to be energized and the red light R2, which is connected in parallel circuit relation to the relay operating coil 123a, to glow. In like manner, should the level of the fluid decrease to an elevation indicated by point $c$ of curve II, contact member 133 will engage contact member 511, thereby causing the relay 130 to operate and the glowing of the yellow light Y3, which is connected in parallel circuit relation to the operating coil 130a.

Should the fluid continue to decrease to a level corresponding to an elevation represented by the point $d$ on curve II of Fig. 2, contact member 134 will engage contact member 511, thereby causing the coil 120a of the relay 120 and the red light R3, which is connected in parallel circuit relation therewith, to be energized, thus indicating that one of the pumps should be stopped. Inasmuch as the operations of the relays having operating coils 120a, 130a, 127a and 123a are similar to the operations of relays having coils 122a and 128a, further detailed description is thought to be unnecessary.

When the attendant starts the third pump motor, the switch 66b will open automatically and the switch 67 will close. The interlock 66c will also open, while the interlock 67c will close connecting the contact member 611 to the supply conductor 69. Should the level of the fluid rise to the point represented by 1 on curve III, contact member 139 will engage contact member 611, and should the liquid continue to rise to a point represented by $j$ on curve III, contact member 141 will engage contact member 611, causing the yellow and the red signal light Y4 and R4 to glow, and their associated relays to operate, as explained for the previous stages of operation.

In this case, however, the relay 124 is operated only through contact member 141. A relay 125 is provided having an operating coil 125a, which is energized through the interlock 126b and one of the interlocks 125b and 124b, and the conductor 154. Upon operation of the relay 124, the interlock 124b is closed, energizing the coil 125a, which causes interlock 125b to close.

Should the level of the fluid decrease to the points represented by $g$ and $h$ respectively, on curve III of Fig. 2, contact members 137 and 138 will respectively engage contact member 611 and cause the yellow and red lights Y5 and R5 to glow at the corresponding levels. The interlocks 120c, 121c, 122c, 123c and 124c, corresponding to like numbered relays, cause the bell 218 to ring indicating that the extreme limit of one of the operating ranges has been reached.

Referring to Figs. 4 and 10, of the drawings, the four illustrated pumping motors 1, 2, 3 and 4 are respectively provided with operating switches 161, 162, 163 and 164, which are respectively provided with operating coils 161a, 162a, 163a and 164a.

When it is desired to start a motor, such as the motor 1, the corresponding start and stop switch 184 is closed, completing a circuit from the supply conductor 175, that is connected to the supply conductor 69, through conductor 177, reset contact members 178 and 179 on the controller for motor 1, conductor 181, coil 182a of the low-voltage relay 182, interlock 183b of the overload switch 183, and start and stop switch 184 to the supply conductor 176 that is connected to the supply conductor 71. The low-voltage interlock 182b is then automatically closed, and the contact members 185 and 186 of the controller 16, which are opened in the "off" position of the controller, are closed as the controller is moved to its first operative position, and to subsequent positions.

This action completes a circuit through the main-switch operating coil 161a and through the relay operating coil 171a, which is connected in parallel circuit relation to the coil 161a. The switch 161 is accordingly closed to connect the motor 1 to the lines 13, 14, 15. Upon interruption of the circuit through the relay coil 182a, either by operation of the start and stop switch 184, or of the overload interlock 183b, the low-voltage interlock 182b will open, thereby interrupting the circuit through the operating coil 161 and necessitating that the controller be returned to its off position to cause the reset contact members 178 and 179 of the controller 16 to engage before the motor may again be started.

The circuits for operating the motor switches 162, 163 and 164 are similar to those described for the switch 161 and control the operation of motors 2, 3 and 4, which are similar to motor 1. The controllers 17, 18 and 19, which are respectively associated with motors 2, 3 and 4, are similar to the controller 16, which is associated with motor 1 and is illustrated diagrammatically in Fig. 6 of the drawing. Green lamps G1, G2, G3 and G4 are connected in parallel circuit relation to the operating coils 161a, 162a, 163a and 164a, respectively, so as to indicate what motors are in operation.

As stated above, the master controller 46 is provided with three drums 47, 48 and 49 which are used, respectively, for the operation of one, two or three pump motors. The three switches 65, 66 and 67 respectively connect contact members 61, 62 and 63 to the supply conductor 69. The operation of the three switches 65, 66 and 67, only one of which may be closed at a time, is automatic and the control circuits for these switches are shown at the top of Fig. 4 and in Fig. 10.

The switch-operating coil 65a is energized through interlocks 66d and 67d from the supply conductors 69 and 71 when one motor only is in operation. When a second motor is connected to the line, one of the relay coils 171a, 172a, 173a and 174a, which are connected in parallel relation to the corresponding main motor starting switches 161a, 162a, 163a and 164a, is energized and closes the correspondingly numbered interlock. For example, when the motor 1 is started, the relay 171 closes interlock 171b. When the motor 2 is started, the relay 172 is actuated, causing the interlock 172b to close a circuit through conductors 165, 166, coil 66a, conductor 167 and interlock 67d to the supply conductor 71.

If either of the motors 3 and 4 is the second motor to be started, the corresponding relays 173 or 174 will close, thus closing interlocks 173b or 174b, which are in parallel circuit relation to the interlock 172b, thus energizing the coil 66a and closing the switch 66. Similarly, should the motor 2 be the first motor to be started, interlock 172c would be closed to complete a circuit through conductor 168 and, upon the starting of one of the motors 3 or 4, through the corresponding interlock 173c or 174c, respectively, energizing the coil 66a and operating the switch 66.

Likewise, as motors 3 and 4 are started, interlocks 173d and 174d close a circuit through conductors 169 and 166, coil 66a, conductor 167 and interlock 67d, thereby causing the switch 66 to operate. As the switch 66 operates the interlock 66d opens, thus deenergizing the coil 65a and opening the switch 65.

The main motor switches 161, 162, 163 and 164, which respectively control motors 1, 2, 3 and 4, are also each provided with a pair of interlocks that control the circuit through the operating coil 67a of switch 67, so that, upon the closing of any three of the four main switches, a circuit will be provided to operate the switch 67. For example, upon motors 1, 2 and 3 being put into operation, interlocks 161b, 162c and 163b will close a circuit from supply conductor 69 through conductors 155, 156 and 157 and coil 67a to the supply conductor 71.

Should motors 1, 4 and 2 be in operation, the circuit would be as described above with the exception that the interlock 164c would be substituted for 163b. Similarly upon motors 2, 3 and 4 being in operation, interlocks 162b, 163c and 164b, will be closed; while if motors 1, 3 and 4 are in operation, interlock 161c will be substituted for 162b, thus closing the circuit from the supply conductor 69 through conductors 155, 159 and 157 and coil 67a to the supply conductor 71.

A reset switch comprising contact members 116 and 117 is connected in parallel circuit relation to interlock 111b, which connects supply circuit conductor 175 to supply circuit conductor 69, by means of conductors 118 and 119. Upon the failure of voltage between the supply conductors 175 and 176, and the supply conductors 69 and 71, the coil 111a of the low-voltage relay 111 will be deenergized, thereby interrupting the circuit to conductor 175 through interlock 111b, interrupting the circuit from supply conductor 69 to master controller 46 through interlock 111c, and closing a circuit through interlock 111d to the operating coil 75a of the pilot motor reversing switch 75.

As voltage again returns to the supply conductors 69 and 71, the switch 75 is operated to cause the pilot motor 45 to be energized in a direction to return the master controller 46 to the "off" position. As the mastercontroller reaches its "off" or zero position the reset switch comprising the contact members 116 and 117 is closed (see Fig. 9), thus again energizing the low-voltage relay 111. The operation of the relay 111 interrupts the circuit through interlock 111d, thereby deenergizing switch 75 to stop the motor 45, and, at the same time again applying voltage to the master controller 46 and to the supply conductor 175 through interlocks 111c and 111d, respectively.

Reference is now made to Fig. 9, which shows the master controller 46 in greater detail than the diagrammatic representations found in Figs. 1 and 3. Contact fingers 221 to 238 are provided for engaging conducting segments 51 and 52 of drum 47; while similar contact fingers, numbered consecutively from 240 to 258, engage conducting segments 53 and 54 of drum 48, and similar contact fingers, numbered from 260 to 278, are provided for drum 49. The different controller positions of the master controller are indicated by the dotted lines numbered from 0', representing the off position, to 23', and correspond to similar positions for as many of the controllers for the several motors as are being governed at any particular time.

Figure 7:
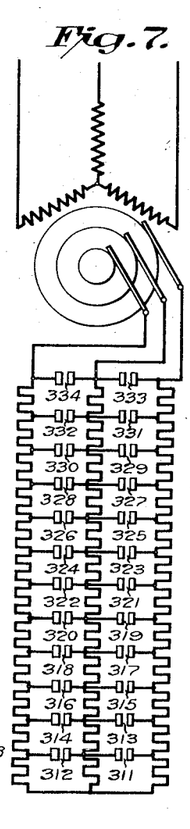
Fig. 7 is a diagrammatic view of the secondary winding of one of the pumping motors, showing the circuits of the controller contact members.

One of the motor controllers, with correspondingly numbered controller positions, is illustrated in Fig. 6 of the drawings. The connection of the controller switch members 311 to 334 to the secondary circuit of the motor is illustrated in Fig. 7 of the drawings. It will be noted that in drum 47, the strip of insulating material 57 steps from the first position rather rapidly to the 17th position where it runs lengthwise with the drum. Since there is lesser pumping friction when a single motor is in operation than when operating a larger number of motors, it is desirable not to permit the full operating speed range of the single motor and, since the energized finger will engage the non-conducting material 57 under balanced conditions, it will not remain advanced beyond the position 17 of the controller.

It will be noted with respect to the drum 48 that the insulating strip of material 58 does not advance beyond the 18th position of the master controller, but that it reaches the 17th position at a point of greater advance along the drum, that is, at a point requiring a greater number of steps in the operation of the rack bar 64 from its initial position to the maximum position that is controlled by this drum. Likewise, the drum 49 may advance to the 23rd or last position of the controller drum, as the position of the rack bar 64 advances, to energize the last contact fingers of that drum.

The contact members 61, 62 and 63 are here shown as bars extending parallel to the drums 47, 48 and 49, respectively, and are respectively engaged by contact members 279, 281 and 282, which are actuated by the rack bar 64 to energize the proper contact finger upon movement of the bar. It will also be noted that the conductors 104 and 105, above referred to in connection with the operation of the switches 98 and 99 for controlling pilot motor 81, terminate in parallel bars extending along beside the drum.

In engagement with these bars, contact members 283 and 284 are provided and they are actuated, in the one or the other direction, as the bar 64 is operated. Between the contact members 283 and 284 and so located as to be engaged thereby, are a series of contact segments numbered from 285 to 304, each segment being adapted to close a circuit between the conductors 104 and 105 through contact members 283 and 284.

Normally, or while the bar 64 is at rest at a particular step in its advance, a particular contact finger will be energized, and the contact members 283 and 284 will be so disposed as to be between two of the adjacent contact segments in the series 285 to 304. When the pilot motor 81 is actuated to move the rack bar 64, the contact members 279, 281 and 282 and the contact members 283 and 284 will be correspondingly moved. The contact members 283 and 284 will immediately engage one of the conducting segments, and cause the completion of a circuit in parallel relation to the interlock 109b, thus continuing the circuit through the energized pilot-motor-operating switch 98 or 99, until the contact members 283 and 284 are moved sufficiently to disengage the contact segment.

Upon movement of the rack bar 64 sufficiently to close a circuit through conductors 104 and 105, relay 106 is operated, closing interlock 106c, thus completing the circuit in shunt relation to the interlock 109b, and energizing the operating coil of relay 109. When relay 109 is operated, the circuit through the interlock 109b is interrupted, which circuit initiated the relay action, and another circuit is continued through one of the conductor segments 285 to 304, until the rack bar 64 has moved a distance corresponding to the spacing of the segments.

When, therefore, the circuit through the conductor segment is broken, the pilot motor 81 will be deenergized, and movement of the rack bar 64 will cease at a point corresponding to the disengagement of the contact members 283 and 284 with one of the conducting segments 285 to 304. At this point the contact members 279, 281, and 282 engage one of the contact fingers on their respectively associated controller drums 47, 48 and 49.

In practice, the spacing of the contact members 92 and 93 on the disc 94 are such that the travel of the contact member 86 from the one to the other corresponds to a 2 inch change in fluid level in the suction well. At each 2-inch change in the height of the water level, therefore, the rack motor 81 will operate to move the rack bar 64 to its next succeeding position, thus causing the master controller 46 to select the correct speed, depending upon the number of pumping motors in service. The float switch is only required to establish a "tickler" circuit, and the operation is taken care of by the pilot motor 81. The float may, therefore, be small and the change in fluid level required to operate the device less than if the float were required to drive the mechanism directly.

As soon as contact is made between contact member 86 and one of the contact members 92 and 93, the pilot motor 81 turns the disc 94, so as to separate the contact members a distance corresponding to a two inch change in fluid level, and then comes to rest. At the same time, the pilot motor 81 moves the rack bar 64 one notch forward or backward, depending upon whether the fluid level has risen or fallen. Movement of the bar 64 correspondingly moves the slidable contact members 279, 281 and 282, thus exciting one of the several contact fingers pressing against the drum. The circuit to the pilot motor 45 is then closed, the pilot motor operating the motor controllers connected to the shaft 21 and turning the master controller drum until the energized finger engages the zig-zag insulating strip on the drum, thus interrupting the action of the pilot motor.

When one or more of the pumping motors 1, 2, 3 and 4 are in operation and it is desired to start another motor, it is necessary to turn the controller of the newly started motor by hand to the position corresponding to that of the motors already in operation, before the clutch connecting the controller to the shaft 21 may be engaged. This ensures that all motor controllers operated upon the shaft 21 remain in corresponding controller positions at all times.

Any individual motor may be controlled manually by its associated hand-wheel, independently of the pilot motor 45, when its associated clutch is in its released position. Under some circumstances it may be desired to manually control as many of the pumping motors as are in operation, independently of the master controller. Provision is made for such manual control by providing a clutch 305 (Fig. 1) between the shaft 21 and the master controller 46. The clutch 305 may be disengaged by the clutch lever 306, thereby permitting the shaft 21 to be operated manually by the hand-wheel 307, independently of the operation of the pilot motor 45 and the master controller 46.

It will be apparent that certain of the contact members for actuating the signals, such as the contact members 411, 511 and 611, are stationary with respect to the master controller drums, and that the several contact members cooperating therewith are actuated in accordance with movements of the drums and are so positioned on the master controller as to engage their cooperating contact members at predetermined positions of the master controller, thereby giving the proper signal to indicate the necessary change that should be made in the motor operating conditions. The motor control may be entirely manually operated by following these signals, if desired. Also the signal circuits may be connected to effect automatic starting and stopping of the pumping motors, if desired.

Many modifications may be made in the apparatus and circuits described without departing from the spirit of my invention, and I do not wish to be limited other than by the scope of the appended claims.

I claim as my invention:

1. In a motor-control system, a plurality of motors, a master switch for controlling the speed of one or more of said motors, means for actuating said switch, means for adjusting the relation of said switch to said actuating means, and means for signalling the approach to the limit of a predetermined working zone for any given number of controlled motors.

2. In a motor-control system, a plurality of motors, a master switch for controlling the speed of one or more of said motors, and means for signalling the approach toward the limit of a speed regulating range corresponding to the number of motors in operation.

3. In a motor-control system, a plurality of motors, individual motor controllers for governing said motors, a master controller for governing said motor controllers, means for automatically actuating said master controller in accordance with the work requirement of said motors, means for manually disconnecting the master controller from said individual motor controllers, and means for manually operating said motor controllers independently of said actuating means.

4. In a motor-control system, a plurality of motors, individual motor controllers for governing said motors, a master controller for governing said motor controllers, float means for actuating said master controller in accordance with a fluid level, means for manually disconnecting said motor controllers from the influence of said float, and means for manually operating said motor controllers independently of said actuating means.

5. In a motor-control system, a plurality of motors, individual motor controllers for governing said motors, a master controller for governing said motor controllers, a float for actuating said master controller in accordance with a fluid level, means for manually adjusting the float levels at which the master controller performs its functions, means for manually disconnecting the motor controllers from the influence of the float, and means for manually operating the motor controllers independently of the float.

6. In a motor-control system, a plurality of motors, a master controller for governing the speeds of said motors, means for actuating said master controller in accordance with a fluid level, and means for varying the speed range of said motors corresponding to given fluid levels in accordance with the number of motors in operation.

7. In a motor-control system, a plurality of motors, a master controller for governing the speeds of said motors, means for manually starting and stopping said motors, means for actuating said master controller in accordance with the required motor service duty, said master controller having means for governing the speeds of said motors over varying speed ranges for corresponding motor service duties, and means responsive to the number of motors in operation for automatically selecting a predetermined motor speed range.

8. In a motor-control system, a plurality of motors, a master controller for governing the speeds of said motors, means for actuating said master controller in accordance with the required motor service duty, said master controller having a plurality of control sections for governing said motors over different predetermined speed ranges for corresponding motor service duties, and means for automatically selecting a particular control section in accordance with the number of motors in operation.

9. In a motor-control system, a plurality of motors, a master controller for governing the speeds of said motors over a plurality of stages of operation depending upon the number of motors in service, and means for automatically interlocking the correct stage of said master controller with the number of motors in service.

10. In a motor-control system, a plurality of motors, means for manually connecting said motors in, and disconnecting said motors from, service, a master controller for simultaneously governing the speeds of all of said motors that are in service over predetermined working ranges corresponding to the number of motors in service, and means for signalling the approach of the limit of a working range.

11. In a motor-control system, a plurality of motors, means for manually connecting said motors in, and disconnecting said motors from, service, a master controller for automatically governing the speeds of said motors over predetermined working ranges corresponding to the number of motors in service, and means for manually regulating the speed of said motors independently of said master controller.

12. In a motor-control system, a plurality of motors, means for manually connecting said motors in, and disconnecting said motors from, service, a master controller for automatically governing the speeds of said motors over predetermined working ranges corresponding to the number of motors in service, and means for effecting visual indication of the operating condition of said motors.

13. In a motor-control system, a plurality of motors, individual controllers for said motors, a pilot motor for actuating said controllers, a master controller for actuating said pilot motor, said master controller comprising a plurality of drums actuated by said pilot motor, each drum having two conducting segments separated by differently patterned insulating means, and a plurality of contact fingers cooperating therewith, means for selecting one of said drums to control said pilot motor, and means for selectively rendering effective the contact fingers associated with the selected drum.

In testimony whereof, I have hereunto subscribed my name this 26th day of January, 1926.

EDMUND F. SIPHER.